(12) United States Patent
Preising et al.

(10) Patent No.: US 9,128,003 B2
(45) Date of Patent: Sep. 8, 2015

(54) DEVICE FOR DYNAMICALLY EXCITING A COMPONENT AND TEST STAND WITH SAME

(71) Applicant: Dr. Ing. h.c.F. Porsche Aktiengesellschaft, Stuttgart (DE)

(72) Inventors: Eric Preising, Tiefenbronn (DE); Johannes Heine, Leonberg (DE); Hans-Peter Loda, Neuhausen/Schellbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/903,061

(22) Filed: May 28, 2013

(65) Prior Publication Data

US 2013/0312507 A1    Nov. 28, 2013

(30) Foreign Application Priority Data

May 25, 2012   (DE) .......................... 10 2012 104 552

(51) Int. Cl.
  *G01M 17/007*   (2006.01)
  *G01M 7/00*    (2006.01)
(52) U.S. Cl.
  CPC .............. *G01M 17/007* (2013.01); *G01M 7/00* (2013.01)
(58) Field of Classification Search
  CPC ....... G01M 17/077; G01M 7/00; G01N 17/04
  USPC ...................................... 73/116.01
  See application file for complete search history.

(56) References Cited

U.S. PATENT DOCUMENTS

| | | | | |
|---|---|---|---|---|
| 4,981,034 | A * | 1/1991 | Haeg ......................... | 73/118.01 |
| 5,083,453 | A * | 1/1992 | Daley ........................ | 73/118.01 |
| 5,241,856 | A * | 9/1993 | Petersen et al. ............ | 73/118.01 |
| 5,465,615 | A | 11/1995 | Petersen et al. | |
| 6,640,638 | B1 * | 11/2003 | Haeg et al. ...................... | 73/669 |
| 7,461,556 | B2 * | 12/2008 | Hamilton ....................... | 73/669 |
| 7,716,996 | B2 * | 5/2010 | Muller et al. ............ | 73/862.044 |
| 7,921,713 | B2 * | 4/2011 | Czoka et al. ............... | 73/117.03 |
| 7,942,046 | B2 * | 5/2011 | Jones ........................ | 73/118.03 |
| 2007/0261499 | A1 | 11/2007 | Hamilton | |
| 2009/0056431 | A1* | 3/2009 | Jones ........................ | 73/118.03 |
| 2013/0055804 | A1* | 3/2013 | Preising et al. ............ | 73/116.01 |
| 2013/0160537 | A1* | 6/2013 | Preising et al. ............ | 73/116.01 |

FOREIGN PATENT DOCUMENTS

| | | |
|---|---|---|
| DE | 102 12 255 | 10/2003 |
| DE | 10212255 A1 * | 10/2003 |

OTHER PUBLICATIONS

German Search Report of Dec. 10, 2012.

\* cited by examiner

*Primary Examiner* — Freddie Kirkland, III
(74) *Attorney, Agent, or Firm* — Gerald E. Hespos; Michael J. Porco; Matthew T. Hespos

(57) ABSTRACT

A device for dynamically exciting a component, in particular a chassis component of a motor vehicle has an actuator (10) with a piston rod (20) and an actuator housing (30). A connecting element (40) is coupled to the piston rod (20) of the actuator (10). A coupling (50) is coupled to the connecting element (40) for connection to the component. The connecting element (40) is coupled to the piston rod (20) in such a manner that the coupling is substantially moment-free.

6 Claims, 3 Drawing Sheets

2. Description of the Related Art

DEVICE FOR DYNAMICALLY EXCITING A COMPONENT AND TEST STAND WITH SAME

CROSS REFERENCE TO RELATED APPLICATIONS

This application claims priority under 35 USC 119 to German Patent Appl. No. 10 2012 104 552.6 filed on May 25, 2012, the entire disclosure of which is incorporated herein by reference.

BACKGROUND

1. Field of the Invention

The invention relates to a device for dynamically exciting a component, in particular a chassis component in the motor vehicle sector.

2. Description of the Related Art

The components of a chassis of a vehicle interact with one another and introduce forces and vibrations into other parts of the vehicle. These interactions, forces and vibrations must be known as accurately as possible to ensure proper development of the chassis with respect to the desired dynamic performance of the vehicle and the comfort for the vehicle occupants.

A test stand with a pulser generally is used for dynamically exciting the components of a chassis that are to be investigated. A very simple pulser of this type can be described as a hydraulic cylinder having complex activation for realizing precise, highly dynamic and reproducible excitations of the chassis components. A pulser of this type is very heavy, and the chassis component to be tested may move under the influence of the dynamic load during the investigation. As a result, the pulser vibrates because of the coupling to the chassis component to be tested, and this vibration impairs the accuracy of the measured vales recorded.

U.S. 2007/0261499 A1 discloses a test stand for the dynamic investigation of a chassis axis that is excited by an actuator supported in relation to a supporting frame during operation of the test stand.

An object of the invention is to provide a device for dynamically exciting components, in particular a chassis component of a motor vehicle, on a test stand, in which increased accuracy of the measured values recorded for the components to be investigated. A further object is to provide dynamic investigation of different components on a single test stand.

SUMMARY OF THE INVENTION

The invention relates to a device for dynamically exciting a component, in particular a chassis component of a motor vehicle. The device comprises an actuator that has a piston rod and an actuator housing. A connecting element is coupled to the piston rod of the actuator in a substantially moment-free manner, and a coupling element is coupled to the connecting element for connection to the component.

The substantially moment-free coupling of the connection element to the actuator enables the component to be excited dynamically in a manner particularly close to reality. As a result, the measured values recorded on the associated test stand are reproducible more accurately. A moment-free coupling is considered to be a coupling in which forces are transmitted between the coupled components, but bending moments and torques are not transmitted. The coupling therefore forms a mounting, in which substantially no moment can be transmitted.

The connecting element can be coupled to the piston rod of the actuator on a side of the actuator that faces away from the coupling. Thus, although the component may tilt about an axis, the angle error during the dynamic investigation at the component being checked can be very small if. As a result, accuracy of the measured values can be improved, particularly if the connecting element is long. The connecting element preferably is coupled to an end of the piston rod below the actuator housing.

The piston rod may pass completely through the actuator housing and first and second connecting sections can be formed at opposite protruding ends of piston rod. The connecting sections at the longitudinal ends of the piston rod can in each case define separate intersections for the connection of different components.

The length of the connecting element can be greater than or equal to the length of the actuator. As a result, the natural frequency of the connecting element and a choice of material for the connecting element is as large as possible. Therefore the component can be checked with great measuring accuracy and free from disturbing vibration influences due to the connecting element, even with large dynamic excitations. Furthermore, the angle error during the dynamic investigation at the component to be checked can be very small for the preceding reasons.

The actuator housing can be connected to a test stand in a positionally fixed manner during operation. The positionally fixed actuator can introduce high dynamic stresses of very great accuracy into the component that is to be checked. Simultaneously, the immovable connection of the actuator to the test stand permits the natural frequency of the actuator/test stand system to be at a high level and outside the natural frequency range of the component to be tested. Furthermore, only the connecting element vibrates during operation and the natural frequency of connecting element lies far above the natural frequency of the test stand. As a result, a large bandwidth of vibrations can be applied to the component, and therefore the component that is to be checked can be excited in a manner as close to reality as possible.

The piston rod can be coupled to the connecting element via a ball and socket joint. This type of coupling can realize the substantially moment-free coupling between the piston rod and the connecting element in a particularly simple and cost-effective manner.

The connecting element can be a frame-shaped component and particularly a planar rectangular frame or a planar approximately square frame with a recess in the central region.

Parallel pillars may be on the edge region of the connecting element and a crossbeam may be on the test stand. Thus, the entire system may have a particularly small overall height and the test stand may have a high natural frequency.

The connecting element can be arranged in a plane with the coupling element before the actuator is put into operation. As a result, the force introduced into the component to be tested can be directed and undertaken in an optimum manner.

The pillars of the connecting element can be formed from a composite material. The composite material for the pillars of the connecting element is preferably a glass fiber-reinforced glass, a metal matrix composite (MMC), a carbon fiber-reinforced silicon carbide, an inherently reinforced thermoplastic, a carbon fiber-reinforced plastic (CFP), a glass fiber-reinforced plastic (GFP) or ceramic matrix composites (CMC). The composite material for the movable connecting element advantageously reduces the mass. Therefore the operating performance of the test stand has very low and uniform vibration so that the quality of the recorded measured values of the test stand is improved.

The actuator can be coupled displaceably to a test stand. As a result, it is possible to improve the possibility of using the present device in such a manner that the actuator can be matched to the dimensions of an individual component or to the dimensions of an entire assembly. Thus, the advantages of the present device for dynamically exciting a component continue to be maintained despite the changeable connection of the actuator to the test stand.

The actuator can be arranged so that the piston rod moves in a substantially vertical direction during operation. Thus, the operating forces of the actuator will be absorbed in an advantageous manner by the test stand during operation and at the same time as optimum an introduction of force into the present device is enabled, with the manner of operation of the actuator being taken into consideration. The vertical direction can be a vertical direction in a main axis system of the device or of the test stand and/or can be identical to the direction of the longitudinal axis of the piston rod.

The coupling element can be coupled pivotably to the connecting element. As a result, the position of the coupling element can be matched during operation to the movement of the component to be tested, and therefore the quality of the measured values can be optimum because of the external forces, which are as small as possible due to the arising arrangement of the component and the coupling element.

The invention also comprises a test stand with the above-described device for dynamically testing components.

The invention is explained in more detail below using exemplary embodiments and with reference to the attached schematic figures of the drawing.

DETAILED DESCRIPTION OF THE PREFERRED EMBODIMENTS

The invention relates to a device for dynamically exciting a component that can be an individual component or an assembly of components. A spring strut, a shock absorber, a wheel disk or a combination thereof are examples of individual components. A vehicle axle and a half vehicle axle are examples of an assembly.

Figure 3:
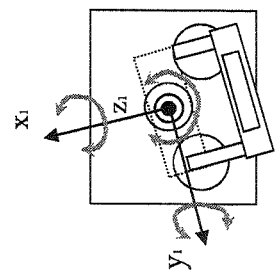
FIG. 3 is a top view of the device for dynamically exciting a component according to FIG. 1.
Figure 2:
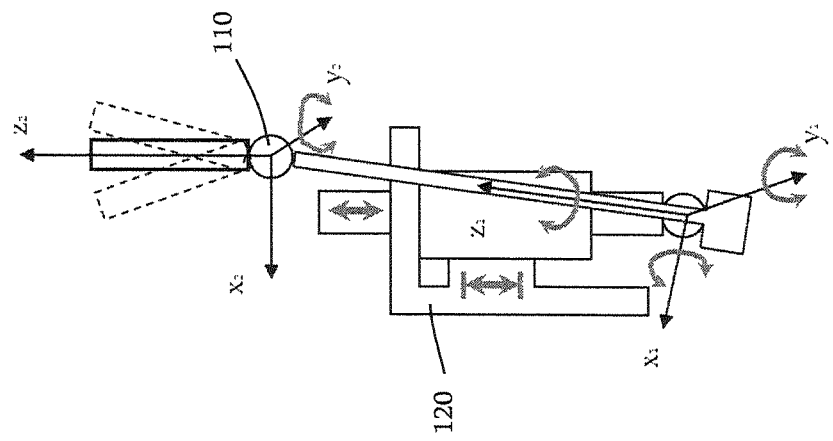
FIG. 2 is a side view of the device for dynamically exciting a component according to FIG. 1.
Figure 1:
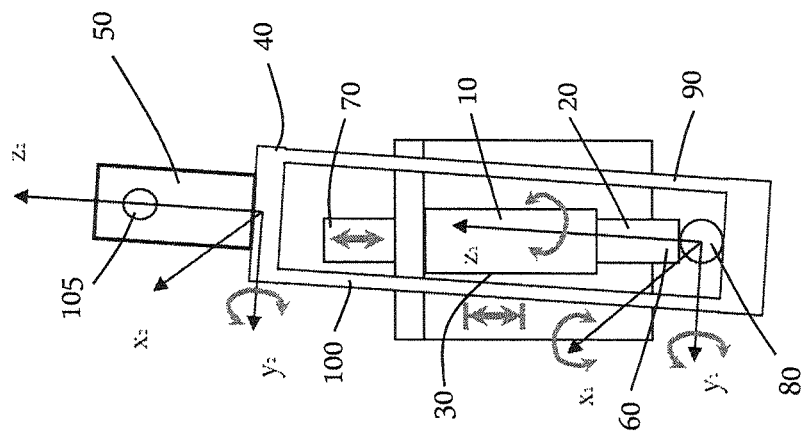
FIG. 1 is a front view of a device for dynamically exciting a component according to an exemplary embodiment of the present invention.

FIGS. 1 to 3 show different views of a device for dynamically exciting a component in accordance with an embodiment of the invention. The device comprises an actuator 10 with a piston rod 20 and an actuator housing 30. The actuator 10 preferably is a servo-hydraulic pulser. The device also has a connecting element 40, a coupling 50 and a ball and socket joint 80. A holder 120 couples the device to a test stand (not illustrated). The actuator 10 is coupled to the test stand so that the actuator 10 is displaceable in the vertical direction outside the test operation of the test stand (see FIG. 2).

The piston rod 20 protrudes on both ends of the actuator 10, and first and second connecting sections 60 and 70 are formed at the longitudinal ends of the piston rod 20. The first connecting section 60 is arranged on the lower side of the actuator housing 30 and includes the ball and socket joint 80 to define a moment-free coupling of the connecting element 40 to the piston rod 20. This connection of the connecting element 40 to the piston rod 20 permits rotation of the connecting element 40 about the x1, y1 and z1 axes of the device so that forces can be transmitted from the piston rod 20 to the connecting element 40.

The connecting element 40 preferably is formed from a composite material, such as a carbon fiber-reinforced plastic (CFP), and can have a frame shape with a recess in the center. Pillars 90, 100 are formed at lateral sides of the connecting element 40. A rotary joint 110 on upper side of the connecting element 40 connects the connecting element 40 to the coupling 50. Therefore the coupling 50 can rotate about the y2 axis (also compare in this regard the possible position of the coupling 50 during rotation about the rotary joint 110, as indicated by dashed lines in FIG. 2). The coupling 50 has a circular recess 105 for connecting the device to the component (not illustrated) to be tested.

During operation, the piston rod 20 carries out a swinging movement that preferably runs in the vertical direction, as illustrated by the double arrow in the region of the second connecting section 70.

Figure 5:
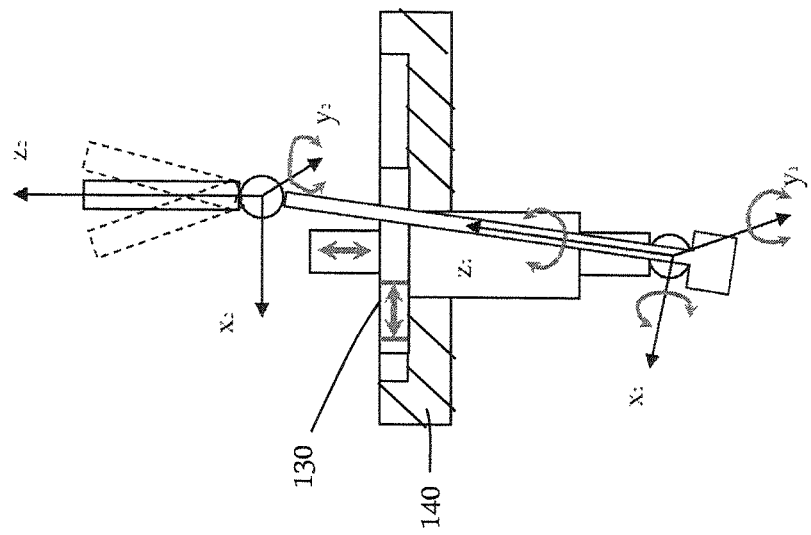
FIG. 5 is a side view of the device for dynamically exciting a component according to FIG. 4.
Figure 4:
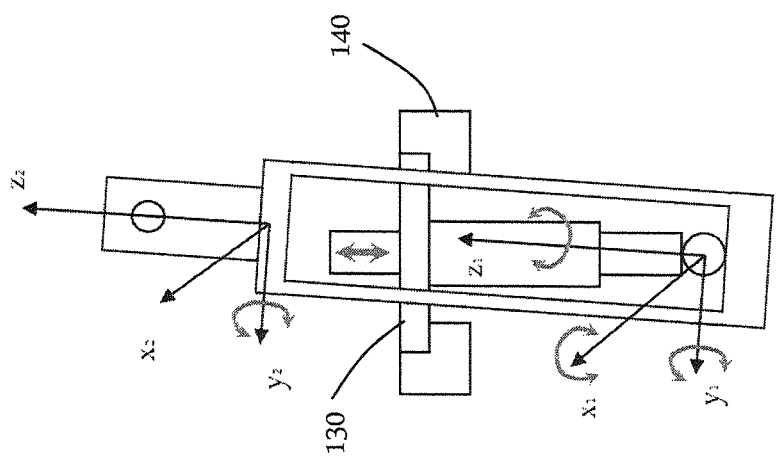
FIG. 4 is a front view of the device for dynamically exciting a component according to FIG. 1 with a displaceable connection to a test stand.

FIGS. 4 and 5 show the device of FIG. 1 with the actuator 10 held by a guide plate 140 which, in turn, is mounted displaceably in the horizontal direction in a guide bed 130 of the test stand.

Before the test stand is put into operation, the device is positioned in the horizontal direction by means of the movable mounting described above to apply the device to the component to be tested or to the assembly to be tested. In this manner, individual components or entire assemblies of differing width can be investigated on a single test stand, thus substantially increasing the flexibility of the test stand.

Figure 6:
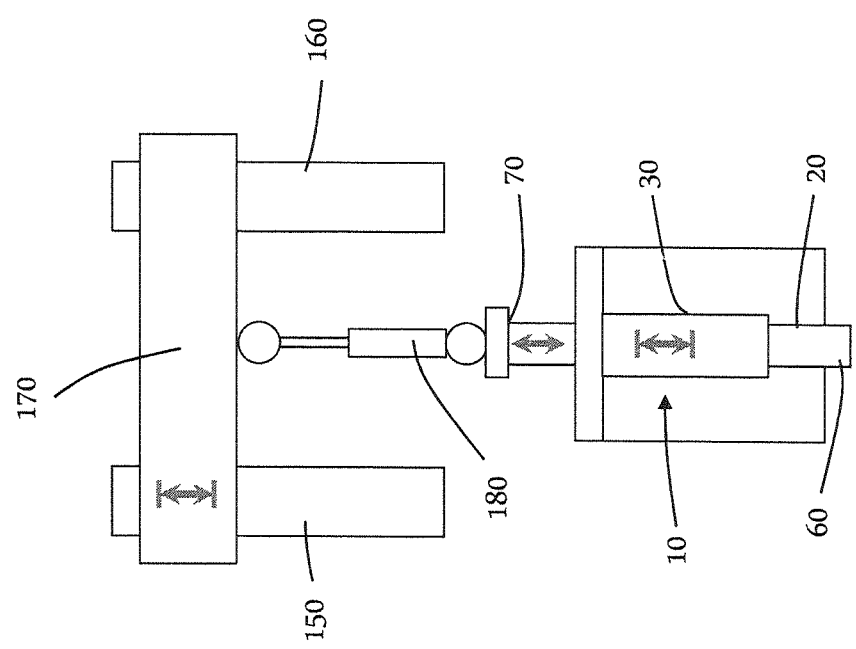
FIG. 6 is a front view of a part for a test stand with a modification of the device for dynamically exciting a component.

FIG. 6 shows a front view of a part for a test stand with a modification of the device for dynamically exciting a component. Analogously to the embodiments of FIGS. 1 and 4, the device of FIG. 6 has an actuator or a pulser 10 and a continuous piston rod 20. The device again is arranged in a positionally fixed manner on the test stand (only partially illustrated) during operation. First and second connecting sections 60 and 70 are formed respectively at the longitudinal ends of the piston rod 20. The second connecting section 70 is arranged above the actuator housing 30 and functions for connecting the component to be tested, here a spring strut 180, to the device.

The testing of the spring strut 180 requires an additional mounting thereof on a crossbeam 170 of the test stand. The crossbeam is mounted and guided in a height adjustable manner by two parallel guide pillars 150, 160 that are spaced apart from each other. The connecting element and the coupling element of the device for dynamically exciting a component are removed if a component that requires the use of the crossbeam 150 is investigated dynamically at the test stand. The manner of operating the pulser 10 during operation of the test stand is substantially identical to the manner of operation of the embodiments of FIGS. 1 and 4.

Although the present invention has been described with reference to preferred embodiments, it is not restricted but rather can be modified in diverse ways. In particular, the above-described developments and exemplary embodiments can be combined with one another as desired. Furthermore, it should be emphasized that "a" does not exclude more than one.

What is claimed is:

1. A device for dynamically exciting a chassis component of a motor vehicle, comprising:
   an actuator with an actuator housing and a piston rod aligned substantially vertically and movably disposed in the actuator housing, the piston rod having a lower end projecting from the actuator housing, the actuator housing being connected to a test stand in a positionally fixed manner during operation and being adjustable relative to the test stand between operations;
   a connecting element having upper and lower ends spaced apart along an extending direction, the lower end of the connecting element being coupled to the lower end of the piston rod of the actuator in a substantially moment-free manner via a ball and socket joint, a length dimension of the connecting element in the extending direction exceeding a vertical length of the actuator; and
   a coupling element coupled pivotably to the upper end of the connecting element for rotation about a single axis transverse to the extending direction of the connecting element and being non-pivotable about other axes, the coupling element being configured for connection to the component.

2. The device of claim 1, wherein the piston rod protrudes on both ends of the actuator.

3. The device of claim 1, wherein the connecting element is a frame-shaped.

4. The device of claim 3, wherein the connecting element has parallel pillars.

5. The device of claim 4, wherein the pillars of the connecting element are formed from a composite material.

6. A test stand with the device of claim 1 for dynamically testing components.

* * * * *